United States Patent
Píngale et al.

(10) Patent No.: US 11,153,268 B2
(45) Date of Patent: Oct. 19, 2021

(54) CLOUD-BASED DYNAMIC HOST CONFIGURATION PROTOCOL CONFIGURATION

(71) Applicant: Hewlett Packard Enterprise Development LP, Houston, TX (US)

(72) Inventors: Amit Píngale, Santa Clara, CA (US); Shabaresha Hemaraju, Santa Clara, CA (US); Dhrumil Desai, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/162,584

(22) Filed: Oct. 17, 2018

(65) Prior Publication Data

US 2020/0127969 A1    Apr. 23, 2020

(51) Int. Cl.
*H04L 29/12* (2006.01)
*H04L 12/66* (2006.01)
*H04L 12/24* (2006.01)

(52) U.S. Cl.
CPC .......... *H04L 61/2015* (2013.01); *H04L 12/66* (2013.01); *H04L 41/0813* (2013.01)

(58) Field of Classification Search
CPC .. H04L 61/2015; H04L 12/66; H04L 41/0813
USPC ........................................................ 709/220
See application file for complete search history.

(56) References Cited

U.S. PATENT DOCUMENTS

| | | | |
|---|---|---|---|
| 6,697,360 B1* | 2/2004 | Gai | H04L 41/0886 370/389 |
| 9,774,470 B2* | 9/2017 | Aken | H04L 12/4641 |
| 10,225,138 B2* | 3/2019 | Wu | H04L 61/2015 |
| 10,397,042 B2* | 8/2019 | Breed | H04L 41/06 |
| 10,609,626 B2* | 3/2020 | Lin | H04L 12/2816 |
| 10,764,238 B2* | 9/2020 | Chanda | H04L 45/586 |
| 2005/0114515 A1* | 5/2005 | Droms | H04L 29/12273 709/227 |
| 2006/0050681 A1* | 3/2006 | Monteiro | H04L 41/0886 370/352 |
| 2009/0279454 A1* | 11/2009 | Wacker | H04L 61/6013 370/255 |

(Continued)

OTHER PUBLICATIONS

Microsoft Computer Dictionary 111 ("command") (5th ed. 2002) (Year: 2002).*

(Continued)

*Primary Examiner* — David P Zarka
(74) *Attorney, Agent, or Firm* — Brooks, Cameron & Huebsh, PLLC

(57) ABSTRACT

An example controller may include processing circuitry and memory including instructions that when executed by the processing circuitry cause the processing circuitry to circuitry cause the processing circuitry to receive a dynamic host configuration protocol (DHCP) configuration from a management server; determine, based on the DHCP configuration, a network device communicatively coupled to the controller, identify an action to be performed by the network device to accommodate the DHCP configuration; and transmit a message to the determined network device indicating the DHCP configuration and the determined action, wherein the network device performs the determined action in response to the receipt of the message.

18 Claims, 6 Drawing Sheets

(56) References Cited

U.S. PATENT DOCUMENTS

| | | | |
|---|---|---|---|
| 2011/0019588 A1* | 1/2011 | Boucadair | H04L 29/12377 |
| | | | 370/254 |
| 2014/0068030 A1* | 3/2014 | Chambers | H04L 41/0809 |
| | | | 709/220 |
| 2014/0153489 A1* | 6/2014 | Perras | H04W 60/00 |
| | | | 370/328 |
| 2015/0084750 A1 | 3/2015 | Fitzgibbon | |
| 2016/0301566 A1 | 10/2016 | Ramasubramani et al. | |
| 2016/0301570 A1* | 10/2016 | Meyer | H04L 67/303 |
| 2017/0026234 A1 | 1/2017 | Dhulipala et al. | |
| 2017/0093624 A1* | 3/2017 | Thondapu | H04L 41/0813 |
| 2017/0237608 A1 | 8/2017 | Wu et al. | |

OTHER PUBLICATIONS

Unifi—Device Adoption Methods for Remote Unifi Controllers, Aug. 11, 2018, pp. 1-13 (online), Retrieved from the Internet on Aug. 23, 2018 at URL: <heip.ubnt.com/hc/en-US/articles/204909754-UniFi-Device-Adoption-Methods-for-Remote-UniFi-Controllers>.

* cited by examiner

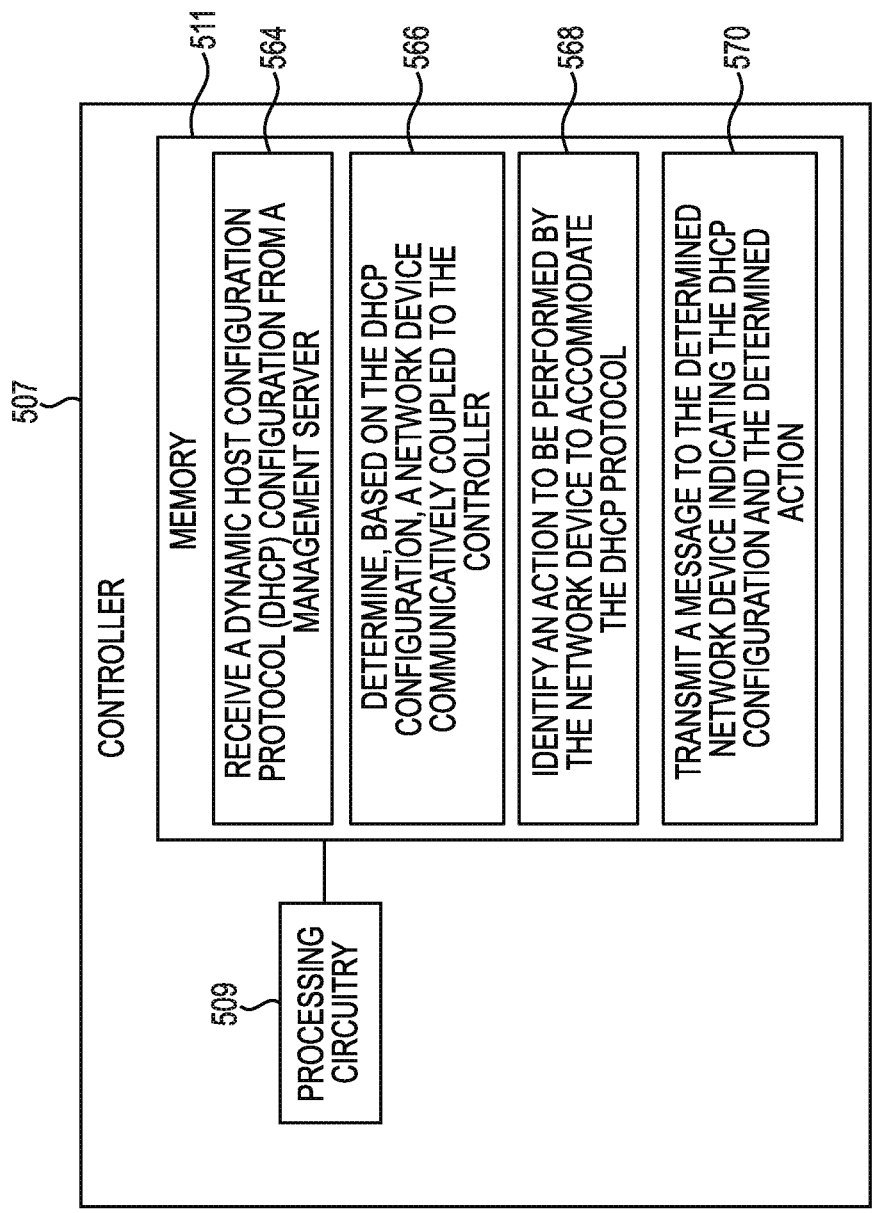

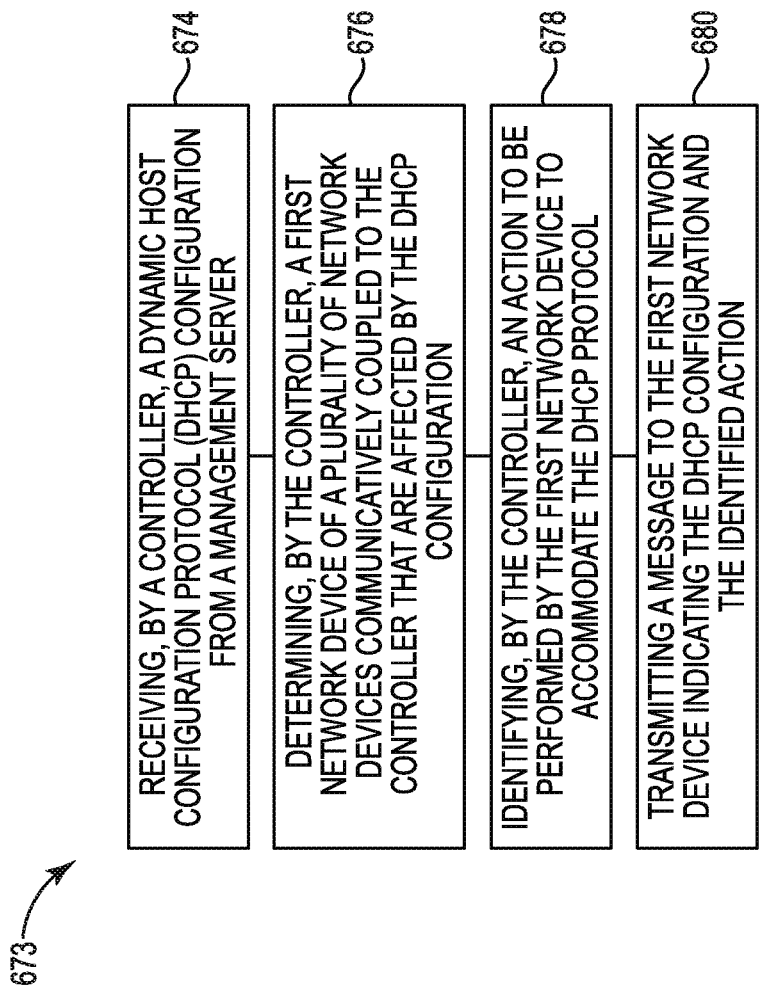

CLOUD-BASED DYNAMIC HOST CONFIGURATION PROTOCOL CONFIGURATION

BACKGROUND

A dynamic host configuration protocol (DHCP) pool may be managed by a management server. The management server may be included on a cloud platform, and a DHCP configuration may be transmitted to a network device via a gateway such that the network device may access the internet, network, and/or other services.

Some approaches to the accommodation of network devices to a DHCP configuration may include manually determining the actions of each communicatively coupled network device to which the new DHCP configuration is applicable. For example, such actions include manually re-booting an AP when the DHCP configuration is applicable to the AP. In another example action, a wirelessly connected computing device is manually disconnected and reconnected to the gateway such that the DHCP configuration is applied to the wireless computing device. In another example action, a port on a switch is manually shut down and manually brought back up such that the switch implements the DHCP configuration.

BRIEF DESCRIPTION OF THE DRAWINGS

FIG. 5 illustrates an example controller including processing circuitry and a non-transitory machine-readable memory for cloud-based dynamic host configuration protocol configuration consistent with the disclosure.

FIG. 6 illustrates an example method for cloud-based dynamic host configuration protocol configuration consistent with the disclosure.

DETAILED DESCRIPTION

Figure 1:
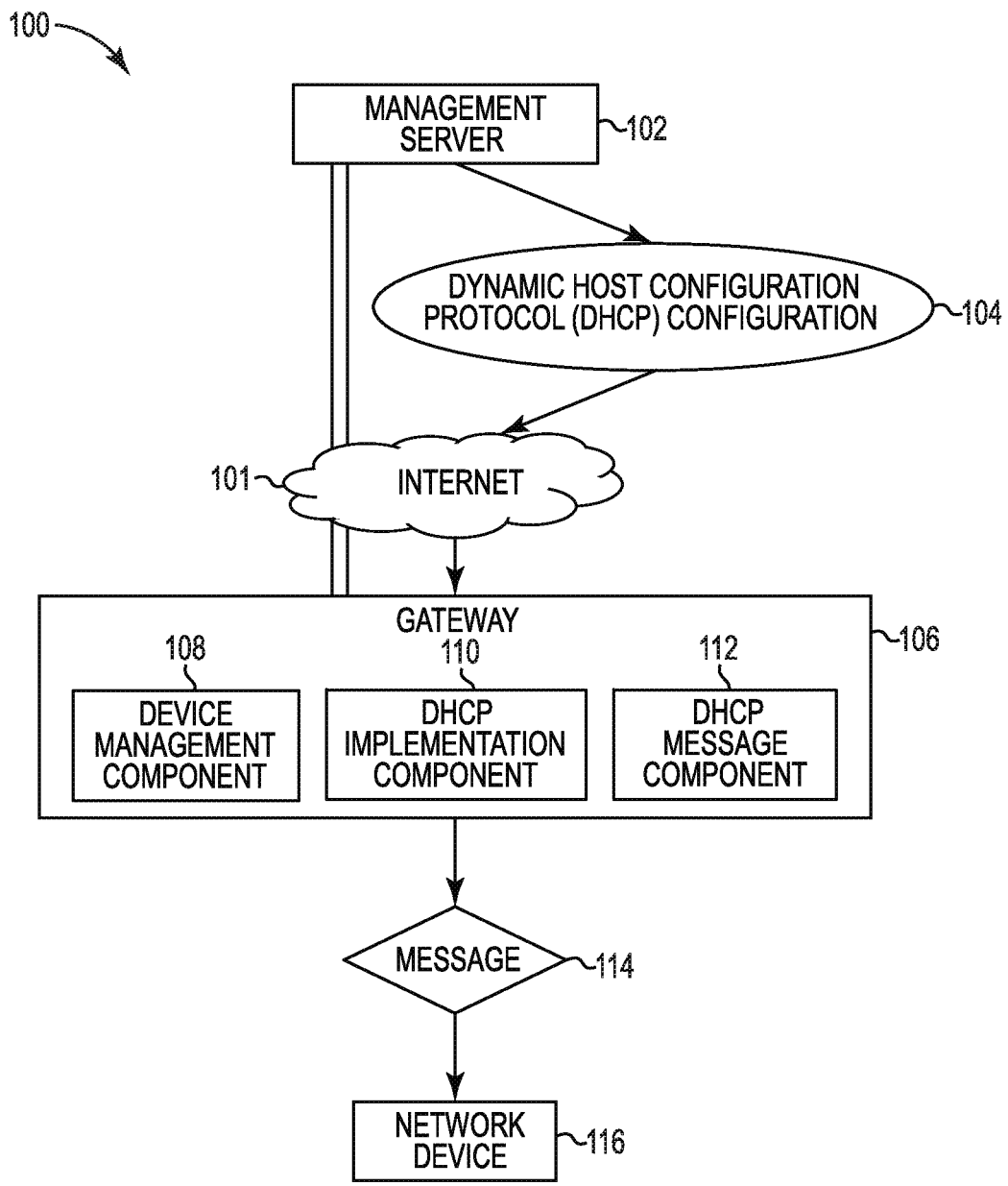
FIG. 1 illustrates an example of a system for cloud-based dynamic host configuration protocol configuration consistent with the disclosure.

Previous approaches to implementing a DHCP pool across wide area networks (WAN) often include manual network administrator intervention. Further, such approaches may affect other devices not directly targeted by a DHCP configuration change. These approaches to implementing a DHCP pool may be cumbersome, time consuming, and error prone, as the network device is disconnected from the network (and/or the internet) until the DHCP configuration is manually implemented to the network device. Further, the implementation of the DHCP configuration may render the affected network devices in an indeterminant state until realized by a network administrator and manual action is taken for each of the network devices.

In contrast, examples of the present disclosure describe a programmatic approach to implementing a DHCP configuration to a network device (or multiple network devices). For example, a gateway (and/or a similar network device such as a router or a switch) receives a DHCP configuration from a management server, determine which network device(s) communicatively couple to the gateway is/are affected by the DHCP configuration, identify an action to be taken by the affected network device(s) to accommodate the DHCP configuration, and transmit a message to the affected network devices. The message may include information related to the DHCP configuration and the identified action specific to each network device affected by the DHCP configuration. In some examples, the DHCP configuration may include a change to the scope of the DHCP. As used herein, the term "scope" refers to a range of IP addresses that are available for assignment and/or lease to network devices on a particular network. For example, a DHCP configuration may include a change in the scope (e.g., the available IP addresses). Scopes determine which IP addresses are provided to the network devices. Scopes of DHCP configurations may be defined and activated before the network devices use the DHCP configuration via the gateway.

Examples of the present disclosure describe, in response to receiving the message from the gateway, that the network device may automatically perform the identified action such that the DHCP configuration (and/or a scope of the DHCP configuration) is accommodated by the network device. As used herein, the term "automatic" and/or "automatically" refers to a network device implementing the DHCP configuration and/or altering an operation of the network device with limited or no manual input and/or with limited or no prompting. For example, a network device automatically performs and/or alters an operation to utilize a DHCP configuration absent manual intervention from a user. In this way, the affected network device automatically accommodates the DHCP configuration and the loss of connection to the network, internet, and/or other services is reduced in comparison to a manual intervention. As used herein, the term "accommodate" refers to a network device altering an operation to utilize a DHCP configuration. Examples, of an accommodation of a network device include actions such as a re-boot, port shut down and no-shut down, etc.

Examples described herein decrease the period of time that the network is interrupted by transmitting the message to the relevant network devices to which the DHCP configuration is applicable. For example, the period of time that the network is interrupted is decreased when the gateway generates a message to affected network devices, and the network devices automatically accommodate the DHCP configuration in response to receiving the message. Examples described herein further improve the network by reducing the number of devices impacted when a DHCP configuration is received. This improves functionality of the network devices. Further, the programmatic approach of the present disclosure to manipulating the relevant network devices via the message reduces (e.g., eliminates) manual intervention as the network devices are manipulated by coded instructions causing the network device to perform actions (e.g., re-boot, port shut down and no-shut down, etc.), thus decreasing the amount of time the affected network devices are inoperable and potential error caused by a user/network administrator/user interface.

FIG. 1 illustrates an example of a system 100 for cloud-based dynamic host configuration protocol (DHCP) configuration consistent with the disclosure. FIG. 1 includes a management server 102 which generates a DHCP configuration 104 for a network device 116 communicatively coupled to a gateway 106. As illustrated by FIG. 1, the management server 102 is communicatively coupled to the gateway 106 via the internet 101. The management server 102 generates the DHCP configuration 104 and transmits the DHCP configuration 104 to the gateway 106 via the internet 101. The gateway 106 may include a device management component 108 to identify the network device 116 that is affected by the DHCP configuration 104, a DHCP implementation component 110 to identify an action to be performed by the network device 116 to accommodate the DHCP configuration 104, and a DHCP message component 112 to transmit a message 114 to the identified network device 116. The message 114 may include information about the DHCP configuration 104 and the identified action to be performed by the network device 116 to accommodate the DHCP configuration 104. Although FIG. 1 illustrates a gateway 106, other computing devices which include similar functions are contemplated herein (e.g. router, servers, etc.). Further, although FIG. 1 illustrates an individual network device 116, multiple network devices 116 are contemplated and specific examples are discussed further in connection with FIG. 2. The gateway 106 may include a controller to facilitate the programmatic approach to accommodating the DHCP configuration.

As used herein, the term "programmatic" refers to a set of instructions applicable to a device, that when executed cause an action (e.g., a re-boot, port shut down, etc.) to be performed by the device. When the action is performed by the network device 116, the DHCP configuration 104 is accommodated by the network device. As used herein, the term "accommodate" and/or "accommodation" refers to a network device 116 having the ability to implement instruction received/transmitted. A network device 116 accommodates a DHCP configuration 104 by performing an action included in a message 114. For example, the message 114 includes instructions that when executed by the network device 116, cause the network device 116 to perform an action to accommodate a DHCP configuration 104. Although not illustrated in FIG. 1 as to not obscure examples of the disclosure, the message 114 may be generated by a controller included in the gateway 106. For example, the gateway 106 includes a controller which further includes processing circuitry and a memory resource.

As used herein, the term "controller" refers to a computing device that manages and/or directs the flow of data between other computing devices. Examples of computing devices may include a network device, a client device, an AP, a management entity, and/or a data transfer device. Computing devices may be adapted to transmit and/or receive signaling, and to process information within such signaling across a network. Examples of processing circuitry are central processing units (CPUs), semiconductor-based microprocessors, and/or other hardware devices suitable for retrieval and execution of instructions stored in a memory resource (e.g., in a non-transitory computer readable medium). Processing circuitry may fetch, decode, and execute instructions. As an alternative, or in addition to, retrieving and executing instructions, processing circuitry may include an electronic circuit (e.g., an application specific integrated circuit (ASIC)) that includes electronic components for performing the functionality of executed instructions. For example, the gateway 106 includes hardware resources that form the device management component 108, the DHCP implementation component 110, and the DHCP message component 112. The gateway 106 receives a DHCP configuration 104 from a management server 102 which may be relevant to a network device 116. As used herein, the term "relevant" refers to a network device and/or network device types which whose operations are affected by a DHCP configuration. As used herein, the term "non-relevant" refers to a network device and/or a network device type whose operations are not affected by a DHCP configuration.

For example, the DHCP configuration 104 is relevant to a specific device type (e.g., and/or multiple device types) such as an AP, a switch, a client device, a controller, a branch gateway, and a wireless client device, or combinations thereof. The gateway 106 includes the device management component 108 to identify the network device 116 that will be affected by the DHCP configuration 104. For example, the DHCP configuration 104 applies to a portion of multiple network devices (e.g., relevant network devices) that are communicatively coupled to the gateway 106 and refrain from applying the DHCP configuration 104 to a different portion of the network devices (non-relevant network devices) (discussed in further detail in connection with FIG. 2).

In a programmatic approach, the gateway 106 may include a DHCP implementation component 110 to identify an action to be performed by the network device 116 to accommodate the DHCP configuration 104. For example, the action identified by the DHCP implementation component 110 corresponds to a device type to which the identified network device 116 belongs. In other words, a network device type can demand a particular action in order for the DHCP configuration 104 to be accommodated by the network device 116.

For example, the network device 116 is an AP, and the action performed by the AP is a re-boot. Subsequent to the re-boot by the AP, the AP accommodates the DHCP configuration 104 and connectivity to the network is restored. To reduce interruption and potential error by a manual re-boot, the gateway 106 automatically initiates the action by generating a message 114. For example, the gateway 106 may include a DHCP message component 112 to transmit a message 114 to the identified network device 116. The message 114 includes information about the DHCP configuration 104 and the identified action to be performed by the network device 116, where the network device 116 performs the identified action in response to the receipt of the message 114.

For example, the DHCP message component 112 transmits the message 114 to including instructions to perform an action that corresponds to a device type of the network device. In other words, the action performed by the network device 116 is initiated automatically by the gateway 106 (and/or a controller), when the gateway 106 transmits the message 114 to the network device 116.

In some examples the network device 116 is an AP, and the action performed is a re-boot of the AP which is automatically initiated by the gateway 106 in response to the AP receiving the message 114. Prior to receiving the message 114, the AP may have been inoperable (e.g., disconnected from the network) because the AP was devoid a DHCP configuration 104. The message 114 generated by the gateway 106 reduces the time the AP is inoperable as the AP automatically performs the action (e.g., the re-boot) to accommodate the DHCP configuration 104 and resume operation in response to receiving the message 114. In this way, the network device 116 (the AP in this instance) automatically performs the action in response to receiving the message 114 from the DHCP message component 112 of the gateway 106.

In another example, the network device 116 is a controller. In some examples the controller may be directly coupled to a client device. The action performed is a port shut down and no-shut down that is performed by the controller in response to the controller receiving the message 114. Prior to receiving the message 114, the controller (and/or the client device coupled to the controller) may have been inoperable (e.g., disconnected from the network) because the controller was devoid a DHCP configuration 104. The message 114 generated by the gateway 106 reduces the time the controller is inoperable as the controller automatically performs the action to accommodate the DHCP configuration 104 and resume operation in response to receiving the message 114. In this way, the network device 116 (the controller in this instance) automatically performs the action in response to receiving the message 114 from the DHCP message component 112 of the gateway 106.

In some instances, the network device 116 is a wireless client device, and the action performed is a packet is transmitted to the wireless client device from a corresponding AP, the packet including a request to disassociate and re-associate the wireless client device to the AP, and the action is automatically initiated by the gateway 106 in response to the wireless client device receiving the message 114. In this instance, the message 114 includes instructions to perform the action specific to the wireless client device. The automatic action performed by the wireless client device may reduce an amount of time that the wireless client device is inoperable on the network. Said differently, because the gateway 106 automatically initiated the action, the wireless client device does not have to wait for a manual intervention by an administrator/user, etc. Further, this programmatic approach may decrease potential error which is incurred by the network through manual intervention.

In some examples, the network device 116 is a switch, and the action performed is a port shut down and no-shut down which is automatically initiated by the gateway 106 in response to the switch receiving the message 114. In this instance, the message 114 includes instructions to perform the action specific to the switch. When the switch performs the specific action, the switch accommodates the DHCP configuration 104. The automatic initiation of the action specific to the switch in response to the receipt of the message 114 decreases the amount of time the switch is disconnected from the network.

In some instances, the network device 116 is a client device coupled to a switch (e.g., a layer-2 switch), and the action performed on the switch is a port shut down and no-shut down which is automatically initiated by the gateway 106 in response to the client device receiving the message 114. In this instance, the message 114 includes instructions to perform the action specific to the client device coupled to the switch. When the client device performs the specific action, the client device accommodates the DHCP configuration 104. The automatic initiation of the action specific to the client device in response to the receipt of the message 114 decreases the amount of time the client device is disconnected from the network.

In some examples, the gateway 106 manages the operation of multiple network devices 116. For example, the gateway 106 is communicatively coupled to a plurality of network devices 116, transmits the messages 114 to a portion of the plurality of network devices 116, and refrains from transmitting a message 114 to another portion of network devices 116. In this way, the gateway 106 generates a message 114 for multiple network devices 116. These examples are discussed in further detail in connection with FIG. 2.

Cloud-based DHCP accommodations according to this disclosure decreases the period of time that a network device 116 is interrupted from participating in network activities, accessing the internet, and/or other services via a gateway 106. The gateway 106 can transmit a message 114 to relevant network devices 116 to which the DHCP configuration 104 is applicable. Further, the programmatic approach to manipulating the relevant network device 116 via the message 114 reduces manual intervention as the network device 116 is manipulated by coded instructions causing the network device 116 to perform actions (e.g., re-boot, port shut down and no-shut down, etc.) thus, decreasing the amount of time the affected network device 116 is inoperable and potential error caused by a user/network administrator/user interface.

Figure 2:
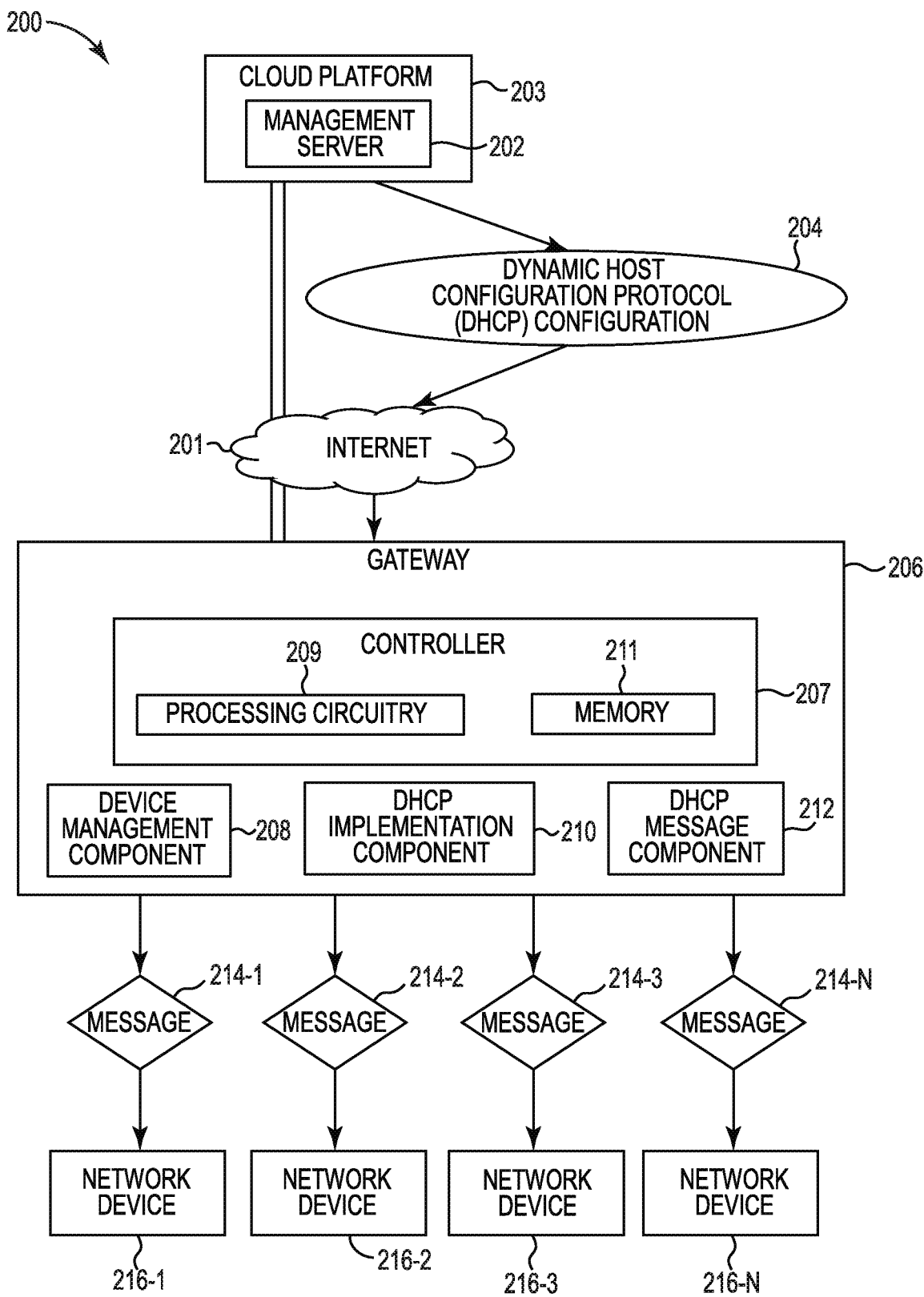
FIG. 2 illustrates another example of a system for cloud-based dynamic host configuration protocol configuration consistent with the disclosure.

FIG. 2 illustrates another example of a system 200 for cloud-based dynamic host configuration protocol (DHCP) configuration consistent with the disclosure. FIG. 2 illustrates a cloud platform 203 which includes a management server 202 which generates a DHCP configuration 204 for network devices 216-1, 216-2, 216-3, and 216-N, communicatively coupled to a gateway 206. As illustrated by FIG. 2, the management server 202 is communicatively coupled to the gateway 206 via the internet 201. The management server 202 generates the DHCP configuration 204 and transmits the DHCP configuration 204 to the gateway 206 via the internet 101. The network devices 216-1, 216-2, 216-3, and 216-N may be a plurality of network devices 216 and may be collectively referred to herein as the network device 216 and/or the network devices 216. Likewise, each network device 216-1, 216-2, 216-3, and 216-N may correspond to a message 214-1, 214-2, 214-3, and 214-N. The message 214-1, 214-2, 214-3, and 214-N may be a plurality of messages 214 and may be collectively referred to herein as the message 214 and/or the messages 214. As illustrated in FIG. 2, the gateway 206 includes a controller 207, including processing circuitry 209, and a memory 211. The controller 207 of the gateway 206 includes hardware resources that may form the device management component 208, the DHCP implementation component 210, and the DHCP message component 212.

The device management component 208 to may identify the plurality network device 216 that may be affected by the DHCP configuration 204. For example, the device management component 208 may identify which types of network devices the DHCP configuration 204 affects and determine whether any of the affected device types are communicatively coupled to the gateway 206. In response to the device management component 208 identifying relevant network devices 216, the DHCP implementation component 210 may identify an action to be performed by each of the plurality of network devices 216 to accommodate the DHCP configuration 204.

For example, the DHCP implementation component 210 identifies which action is demanded by the affected device types in order to accommodate the DHCP configuration 204. In response to the DHCP implementation component 210 identifying the action, a DHCP message component 212 transmits a messages 214-1, 214-2, 214-3, and 214-N to the corresponding identified network devices 216. The message 214 includes information about the DHCP configuration 204 and the identified action to be performed by the network device 216 to accommodate the DHCP configuration 204. As illustrated by FIG. 2, the controller 207 is included on a gateway 206 and the management server 202 remotely manages the gateway 206 from a cloud platform 203.

In some examples, the cloud platform 203 includes the management server 202 to manage multiple gateways (e.g., the gateway 206) within a network. For example, the management server 202 transmits a DHCP configuration 202 to multiple gateways within a network. In other words, the management server 202 provides a DHCP configuration to multiple gateways such that network devices 216 can connect to a network, the internet, and/or other services provided by the cloud platform 203. As used herein, the term "cloud platform" broadly refers to a network that delivers requested virtual resources as a service. In some examples, a cloud network provides a computing environment where users can have access to applications or computing resources, as services, from anywhere through their connected devices. These services may be provided by entities called cloud services providers. Examples of services that are provided via a cloud network include infrastructure as a service (IaaS), platform as a service (PaaS), and software as a service (SaaS). The cloud platform 203 includes a controller (e.g., the management server 202) to orchestrate and manage the infrastructure resources of the VIM and control the network services of the cloud platform 203. The cloud platform 203 may be a public cloud platform, a private cloud platform, and/or a hybrid cloud platform.

As used herein, the term "public cloud platform" refers to services provided by a service provider over a network that makes applications, storage, and other resources available to the general public. For example, these services are offered by the service provider on a pay-per-use model. In this example, the public cloud service providers own and operate the infrastructure. In another example, the public cloud service provider offers access via a public network such as, for example, the Internet, and direct connectivity is not offered. An example of a cloud service provided within a public cloud is a cloud storage platform which may be developed and sold as a service by a company.

As used herein, the term "private cloud platform" refers to a cloud computing environment in which access is exclusively limited to an individual or a business entity. For example, a private cloud is a cloud infrastructure operated for a single individual or business entity. For instance, the private cloud is managed internally by the owner of the private cloud infrastructure. In some examples, the private cloud is managed by a third-party and hosted internally or externally.

As used herein, the term "hybrid cloud platform" can, for example, refer to a cloud computing environment that comprises a number of public cloud resources and a number of private cloud resources. For example, a hybrid cloud comprises a cloud network (or a plurality of cloud networks) such as private clouds and public clouds that remain individual networks but are associated to offer a number of services.

As mentioned herein, the controller 207, via the device management component 208, manages a plurality of network devices 216, and a particular network device may be determined from the plurality of network devices 216 based on which network devices of the plurality of network devices 216 are affected by the DHCP configuration 204. For example, the device management component 208 manages a plurality of network devices 216 communicatively coupled to the gateway 206 and categorize the plurality of network devices 216 by device type (e.g., AP, switch, wireless device, etc.). In other words, the device management component 208 manage the network devices 216 to determine which of the network devices 216 will be affected by the DHCP configuration 204. In this way, the DHCP implementation component 210 may identify an action to be performed by the network devices 216 determined by the device management component 208 to be affected by the DHCP configuration 204.

Specifically, the device management component 208 may determine that the network devices 216-1 and 216-2 correspond to device types that are affected by the DHCP configuration 204. In response to this determination, the DHCP implementation component 210 identifies an action corresponding to the device type of the network device 216-1 and the network device 216-2. Thus, refraining from identifying an action to the unaffected devices 216-3 and 216-N. The DHCP message component 212 may transmit messages 214-1 and 214-2 including the DHCP configuration 204 and the identified action corresponding to each device 216-1 and 216-2. In this way, the network devices 216-1 and 216-2 automatically performs the action in the corresponding messages 214-1 and 214-2 such that each network device 216-1 and 216-2 accommodates the DHCP configuration 204.

By the controller 207 avoiding generating messages 214 to network devices that are not relevant to the DHCP configuration 204, network resources may be reserved and the network devices 216 may operate efficiently by receiving information about DHCP configurations 204 when they are applicable to the network device 216. For example, the controller 207 refrains from transmitting the message 214-3 to the network device 216-3 based on the DHCP configuration 204. Specifically, the controller 207, via the device management component 208, determines that the network device type of the network device 216-3 is excluded from the DHCP configuration 204. In response to the determination by the device management component 208, the DHCP implementation 210 refrains from identifying an action corresponding to the network device type of the network device 216-3. Further, the DHCP message component 212 refrains from transmitting a message 214-3 to the network device 216-3 as the network device 216-3 is not relevant to the DHCP configuration 204. In some examples, the cloud platform 203 may modify, generate, or otherwise provide an altered and/or new scope to the DHCP configuration 204 in a virtual Local Area Network (VLAN).

For example, the management server 202 of the cloud platform 203 may manage a gateway 206 in a VLAN topology. Specifically, the management server 202 may generate a new (and/or a different) scope of the DHCP configuration 204. In this instance, the DHCP configuration 204 is transmitted to the gateway 206 via the internet 201. The network devices 216 communicatively coupled to the gateway 206 may correspond to different VLANs within the system 200. For example, the network device 216-1 may be a switch of a first VLAN, the network device 216-2 may be a switch of a second VLAN, the network device 216-3 may be a switch of a third VLAN, and the network device 216-N may be a switch of a Nth VLAN. Although specific examples herein refer to a switch, other network device types (e.g., controllers, APs, etc.) are contemplated herein. The network devices 216-1 . . . 216-N of each VLAN may include other devices which may be coupled to each network device 216-1 . . . 216-N to obtain the scope for the DHCP configuration 204.

For example, the gateway 206 receives the scope of the DHCP configuration 204, and the DHCP management component 208 may identify the VLANs (e.g., the switches/network devices 216) communicatively coupled to the gateway 206. The DHCP implementation component 210 may determine that the scope of the DHCP configuration 204 applies to the second VLAN 216-2 and is not applicable to the first VLAN 216-1, the third VLAN 216-3 and the Nth VLAN 216-N. In response to the determination by the DHCP implementation component 210, the controller 207 generates a message 214-2 which includes an action such that the network device 216-2 (the switch of the second VLAN) may accommodate the scope of the DHCP configuration 204. Specifically, in response to the gateway 206 receiving the scope of the DHCP configuration 204, the gateway 206 may generate a message 214-2 that affects the second VLAN (via the switch 216-2). The message 214-2 may include instructions for the switch 216-2 to perform a port shut down and no-shut down such that the devices that may be communicatively included in the second VLAN may accommodate the scope of the DHCP configuration 204.

In other examples, the network devices 216 may be APs of a VLAN and the action performed may be the AP deauthorizing the associated devices (e.g., client devices) of the respective VLANs and reauthorizing the respective VLANs such that the associated devices may accommodate the scope of the DHCP configuration 204 via the associated APs (the network devices 216). In this way, cloud-based DHCP configurations may be applied to VLAN configurations such that the network devices 216 associated with VLANs may accommodate new and/or altered scopes to DHCP configurations. Using a programmatic approach, the gateway 206 avoids the manipulation of network devices 216 (and corresponding VLANS) which remain unaffected by new/altered scopes to DHCP configurations.

Cloud-based DHCP configurations according to this disclosure may decrease the period of time that a plurality network devices 216 is interrupted from participating in network activities, accessing the internet, and/or other services via a gateway 206. Additionally, cloud-based DHCP configurations may be utilized in a VLAN topology to provide a DHCP configuration 204 and/or a new and/or altered scope of DHCP configurations to network devices 216 corresponding to multiple VLANs. The gateway 206 may manage a plurality of network devices 216 and avoid wasting network resources by transmitting messages 214 to network devices 216 that will be affected by the DHCP configuration 204 and refraining from transmitting messages 214 to other network devices 216 that are unaffected by the DHCP configuration 204. Further, the programmatic approach to manipulating the relevant network devices 216 via the message 214 and refraining from manipulating the unaffected network devices 216 reduces manual intervention as the network device 216 may be manipulated by coded instructions causing the network device 216 to perform actions, thus, decreasing the amount of time the affected network device 216 is inoperable and potential error caused by a user/network administrator/user interface.

Figure 3:
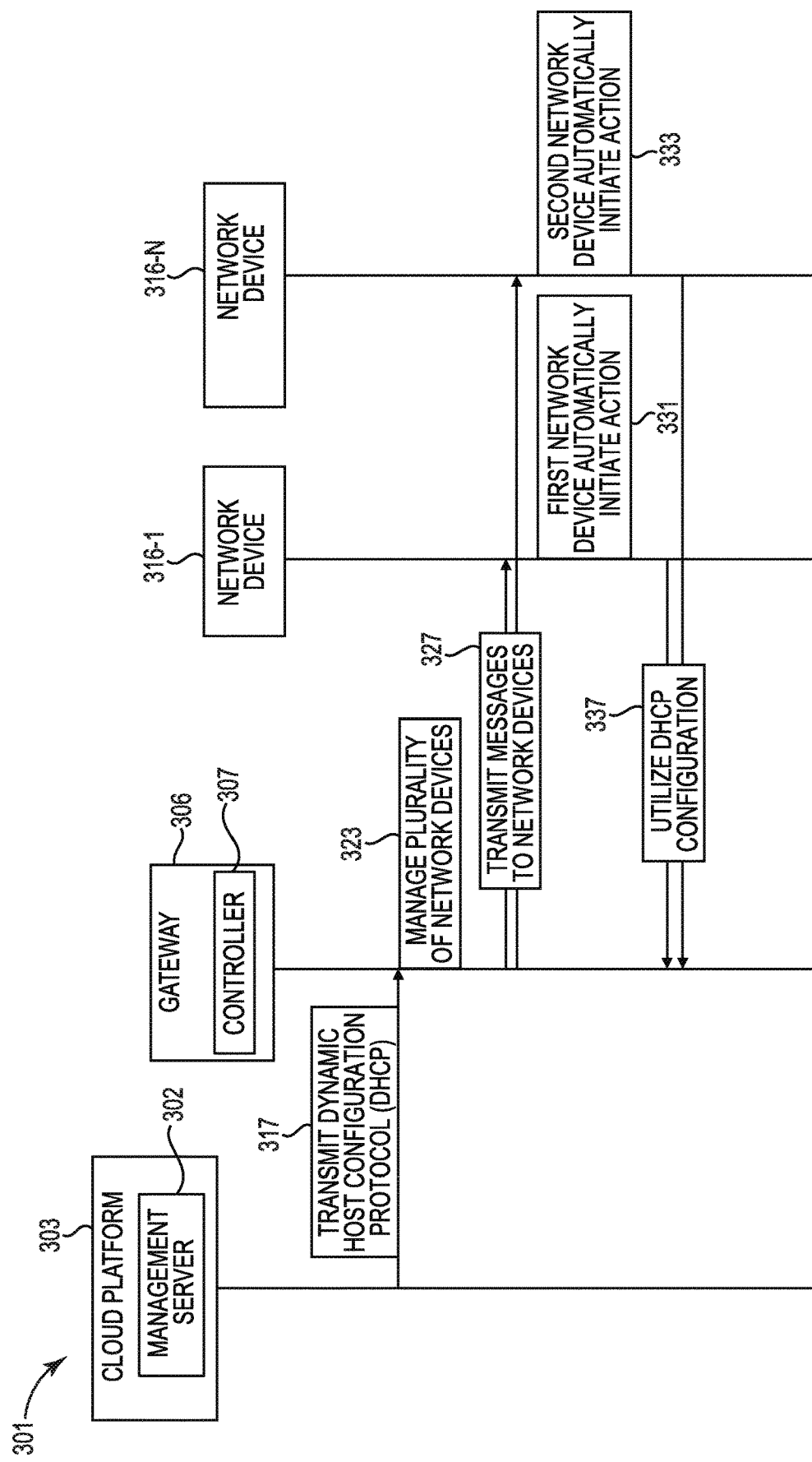
FIG. 3 illustrates an example message flow for cloud-based dynamic host configuration protocol configuration consistent with the disclosure.

FIG. 3 illustrates an example message flow 301 for cloud-based dynamic host configuration protocol configuration consistent with the disclosure. FIG. 3 illustrates a cloud platform 303, a management server 302, a gateway 306, a controller 307, a first network device 316-1, and a second network device 316-N. Although not illustrated in FIG. 3 as to not obscure examples of the disclosure, the controller 307 may include processing circuitry (e.g., the processing circuitry 209) and the memory (e.g., the memory 211). Likewise, although not illustrated in FIG. 3 as to not obscure examples of the disclosure, the gateway 306 may include hardware resources that may form the device management component (e.g., the device management component 108), the DHCP implementation component (e.g., the DHCP implementation component 110), and the DHCP message component (e.g., the DHCP message component 112). The cloud platform 303 provides the operations of a network to which the network devices 316-1, and 316-N (collectively referred to herein as the network devices 316) access services. The management server 302 may determine that a DHCP configuration is applicable for the network devices 316 to receive access to the network.

For example, at 317, the management server 302 transmits a DHCP configuration (e.g., the DHCP configuration 104) to the gateway 306. In some examples, the DHCP configuration is a new DHCP configuration to replace an old, incorrectly operating, expired, or otherwise non-usable DHCP configuration. In other examples, the DHCP configuration is generated to provide connectivity to a device that is otherwise disconnected to the network and/or was previously without a DHCP configuration. The gateway 306, via the controller 307, determines which device types the DHCP configuration is applicable.

For example, at 323, the controller 307, via the device management component, manages a plurality of network devices 316 communicatively coupled to the gateway 306 and categorize the plurality of network devices 316 by device type (e.g., AP, switch, wireless device, etc.). The device management component may manage the network devices 316 to determine which of the network devices 316 will be affected by the DHCP configuration. In this way, the DHCP implementation component identifies an action to be performed by the network devices 316 determined by the device management component to be affected by the DHCP configuration.

Specifically, the device management component determines that the network devices 316-1 and 316-N correspond to device types that are affected by the DHCP configuration. In response to this determination, the DHCP implementation component may identify an action corresponding to the device type of the network device 316-1 and the network device 316-N. The DHCP message component may transmit messages (e.g., the messages 214) including the DHCP configuration and the identified action corresponding to each device 316-1 and 316-N.

For example, at 327 the gateway, via the controller (and the DHCP message component), transmits a first message to the first network device 316-1 and a second message to the second network device 316-N. In this way, the network devices 316-1 and 316-N may automatically perform the action in the corresponding messages such that each network device 316-1 and 316-N accommodates the DHCP configuration. Specifically, at 331, the first network device 316-1 may automatically perform the action in the message. In some examples, the first network device 316-1 is a wireless client device, and the action performed is a packet is transmitted to the wireless client device from a corresponding AP. In such an example, the packet includes a request to disassociate and re-associate the wireless client device to the AP, and the action is automatically initiated at 331 by the gateway 306 in response to the wireless client device receiving the message. In this instance, the message includes instructions to perform the action specific to the wireless client device. The automatic action performed by the wireless client device at 331 reduces an amount of time that the wireless client device is inoperable on the network. Said differently, because the gateway 306 automatically initiated the action, the wireless client device does not have to wait for a manual intervention by an administrator/user, etc. Further, this programmatic approach decreases potential error which may be incurred by the network through manual intervention.

In another example, at 333, the second network device 316-N automatically performs the action in the message. In an example in which the second network device 316-N is a client device coupled to a switch (e.g., a layer-2 switch). The action performed on the switch is a port shut down and no-shut down which is automatically initiated at 333 by the gateway 306 in response to the client device receiving the message, the message includes instructions to perform the action specific to the client device coupled to the switch. When the client device performs the specific action, the client device accommodates the DHCP configuration. The automatic initiation at 333 of the action specific to the client device in response to the receipt of the message decreases the amount of time the client device is disconnected from the network.

For example, the first network device 316-1 and the second network device 316-N implement the DHCP configuration and communicatively connect to the gateway 306 at 337 utilizing the DHCP configuration to obtain and/or maintain connectivity to the network provided by the cloud platform 303, the internet, and/or other services.

Cloud-based DHCP accommodations according to this disclosure may decrease the period of time that a plurality network devices 316 is interrupted from participating in network activities, accessing the internet, and/or other services via a gateway 306. The gateway 306 may manage a plurality of network devices 316 and may avoid wasting network resources by transmitting messages to network devices 316 that prompt the network devices 316 to automatically perform an action to accommodate the DHCP request.

Figure 4:
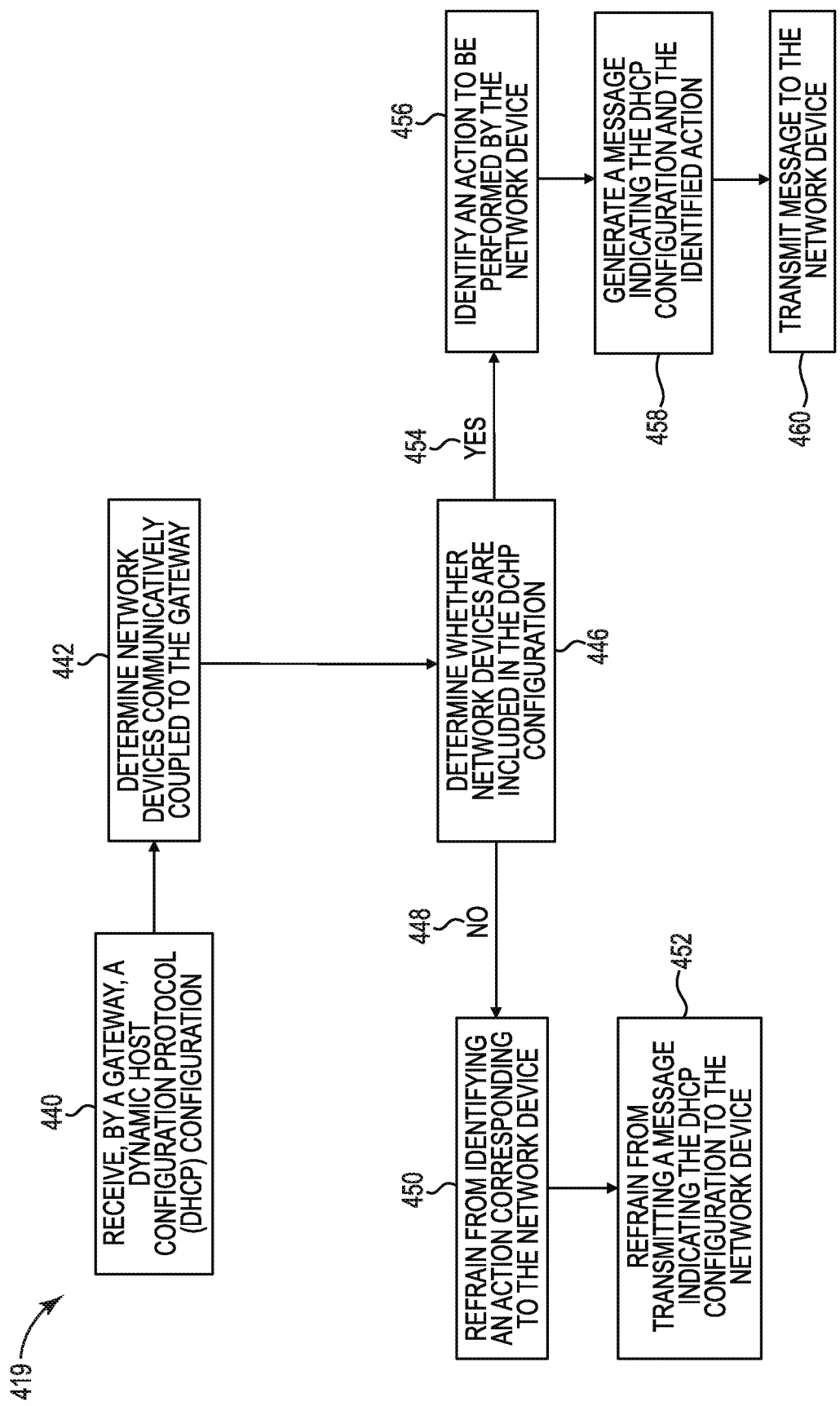
FIG. 4 illustrates an example flow diagram for cloud-based dynamic host configuration protocol configuration consistent with the disclosure.

FIG. 4 illustrates an example flow diagram 419 for cloud-based dynamic host configuration protocol configuration consistent with the disclosure. At 440, a gateway (e.g., the gateway 106) receives a DHCP configuration (e.g., the DHCP configuration 104) from a management server (e.g., the management server 102) included on a cloud platform (e.g., the cloud platform 203). In some examples, the DHCP configuration is a new DHCP configuration to replace an old, incorrectly operating, expired, or otherwise non-usable DHCP configuration. In other examples, the DHCP configuration is generated to provide connectivity to a device that is otherwise disconnected to the network and/or was previously without a DHCP configuration. The gateway, via a controller (e.g., the controller 207), determines which device types are relevant to the DHCP configuration.

For example, at 442, the controller determines the network devices (e.g., the network devices 216) that are communicatively coupled to the gateway. For example, the controller via the device management component (e.g., the device management component 208) manages a plurality of network devices communicatively coupled to the gateway and categorize the plurality of network devices by device type (e.g., AP, switch, wireless device, etc.). The device management component manages the network devices to determine which of the network devices will be affected by the DHCP configuration. In this way, at 446, a DHCP implementation component (e.g., the DHCP implementation component 210) identifies an action to be performed by the network devices determined by the device management component to be affected by the DHCP configuration.

In other words, at 446, the controller (via the DHCP implementation component) determines whether network devices are included in the DHCP configuration. For example, the controller determines that the DHCP configuration does not include a first network device (and/or network device type) ("NO" at 448) by identifying the network device type and comparing the network device type to the DHCP configuration. In this instance, the controller, via the DHCP implementation component does not identify an action for the first network device. Specifically, at 450, the controller may refrain from identifying an action corresponding to the first network device because the first network device is not relevant to the DHCP configuration. Thus, at 452, the controller, via a DHCP message component (e.g., the DHCP message component 212) does not transmit a message to the first network device. In other examples, the controller determines that a second network device is relevant to the DHCP configuration.

For example, the controller determines that the DHCP configuration does include a second network device (and/or network device type), ("YES" at 454) by identifying the network device type and comparing the network device type to the DHCP configuration. In this instance, the controller, via the DHCP implementation component identifies an action for the second network device. Specifically, at 456, the controller identifies an action corresponding to the second network device because the second network device is relevant to the DHCP configuration. In response to this determination, the controller at 458 generates a message indicating the DHCP configuration and the identified action. Thus, at 460, the controller, via a DHCP message component transmits a message to the second network device. In other words, the DHCP message component transmits a message generated by the controller to the second network device. In response to receiving the message, the second network device performs the action, thus accommodating the DHCP configuration.

Examples of FIG. 4 describe the gateway managing a plurality of network devices and may avoid wasting network resources by transmitting messages to network devices that will be affected by the DHCP configuration and refraining from transmitting messages to other network devices that are unaffected by the DHCP configuration. In this way, cloud-based DHCP configurations according to this disclosure may decrease the period of time that a plurality network devices is interrupted from participating in network activities, accessing the internet, and/or other services via a gateway. Thus, decreasing the amount of time the affected network device is inoperable, and potential error caused by a user/network administrator/user interface.

FIG. 5 illustrates an example controller 507 including processing circuitry 509 and a non-transitory machine-readable memory 511 for cloud-based dynamic host configuration protocol configuration consistent with the disclosure. As illustrated in FIG. 5, the controller 507 includes processing circuitry 509 and a memory 511. The processing circuitry 509 may be a hardware processing unit such as a microprocessor, microcontroller, application specific instruction set processor, coprocessor, network processor, or similar hardware circuitry that may cause machine-readable instructions to be executed. In some examples, the processing circuitry 509 may be a plurality of hardware processing units that may cause machine-readable instructions to be executed. The processing circuitry 509 may include central processing units (CPUs) among other types of processing units. The memory 511 may be any type of volatile or non-volatile memory or storage, such as random-access memory (RAM), flash memory, read-only memory (ROM), storage volumes, a hard disk, or a combination thereof.

The memory 511 stores instructions thereon, such as instructions 564, 566, 568, and 570. When executed by the processing circuitry 509, the instructions cause the controller 507 to perform specific tasks and/or functions. For example, the memory 511 stores instructions 564 which are executed by the processing circuitry 509 to cause the controller 507 to receive a DHCP configuration (e.g., the DHCP configuration 104) from a management server (e.g., the management server 102). In some examples, the controller 507 determines a network device (and/or a plurality of network devices that are affected by the DHCP configuration.

For example, the memory 511 stores instructions 566 which are executed by the processing circuitry 509 to cause the controller 507 to determine, based on the DHCP configuration, a network device (e.g., the network devices 216) communicatively coupled to the controller (e.g., and/or the gateway 206). For example, the controller 507 determines the network devices that are communicatively coupled to the gateway. For example, the controller 507 via the device management component (e.g., the device management component 208) manages a plurality of network devices communicatively coupled to the gateway and categorize the plurality of network devices by device type (e.g., AP, switch, wireless device, etc.). The device management component manages the network devices to determine which of the network devices will be affected by the DHCP configuration. The controller 507 determines the affected devices and identify an action for each of the affected devices to accommodate the DHCP configuration.

For example, the memory 511 stores instructions 568 which are executed by the processing circuitry 509 to identify an action to be performed by the network device to accommodate the DHCP configuration. For example, the controller 507 identifies an action corresponding to the network device because the network device is relevant to the DHCP configuration. In response to this determination, the controller 507 generates a message indicating the DHCP configuration and the identified action.

For example, the memory 511 stores instructions 570 which are executed by the processing circuitry 509 to transmit a message to the determined network device indicating the DHCP configuration and the determined action, where the network device performs the determined action in response to the receipt of the message. For example, the controller 507 generates a message indicating the DHCP configuration and the identified action. Thus, the controller, via a DHCP message component (e.g., the DHCP message component 112) transmits a message to the network device. In other words, the DHCP message component transmits a message generated by the controller 507 to the network device. In response to receiving the message, the network device performs the action, thus accommodating the DHCP configuration.

FIG. 6 illustrates an example method 673 for cloud-based dynamic host configuration protocol configuration consistent with the disclosure. At 674, receiving, by a controller (e.g., the controller 207), a DHCP configuration (e.g., the DHCP configuration 204) from a management server (e.g., the management server 202). In some examples, the controller determines a network device (and/or a plurality of network devices) that are affected by the DHCP configuration. For example, at 676, determining, by the controller, a first network device (e.g., the network device 216-1) of a plurality of network devices (e.g., the plurality of network devices 216) communicatively coupled to the controller that are affected by the DHCP configuration.

For example, a device management component (e.g., device management component 208) manages the plurality of network devices to determine which of the plurality of network devices will be affected by the DHCP configuration. Specifically, at 678, identifying, by the controller, an action to be performed by the first network device to accommodate the DHCP configuration. In this way, a DHCP implementation component (e.g., the DHCP implementation component 210) identifies an action to be performed by the first network device determined by the device management component to be affected by the DHCP configuration. The action may be transmitted as a message to the first network device.

For example, at 680, transmitting a message to the first network device indicating the DHCP configuration and the identified action, wherein the first network device performs the determined action in response to the receipt of the message. Specifically, the controller generates a message indicating the DHCP configuration and the identified action. Thus, the controller, via a DHCP message component (e.g., the DHCP message component 212) transmits a message to the first network device. In other words, the DHCP message component transmits a message generated by the controller to the first network device. In response to receiving the message, the first network device performs the action, thus accommodating the DHCP configuration. In some examples, the controller identifies a second network device affected by the DHCP configuration and transmit a message to the second network device.

For example, determining, by the controller, a second network device of the plurality of network devices and identifying, a second action to be performed by the second network device; and transmitting, second message to the second network device indicating the DHCP configuration and the identified second action. In this way, the controller programmatically implements the DHCP configuration to the first network device and the second network device. The message sent to the respective first and second network devices includes an action specific to the respective device types. In other words, the action performed by the first network device enables the first network device to accept the DHCP configuration, and the action is performed by the first network device automatically in response to receiving the message from the controller.

In an example in which the first network device is of a first device type, and the second network device are of a second device type, and the first action and the second action correspond to the respective first and second device types. Specifically, the first network device in this instance is a client device coupled to a switch. When the client device performs the specific action, the client device accommodates the DHCP configuration. The automatic initiation of the action specific to the client device in response to the receipt of the message decreases the amount of time the client device is disconnected from the network.

In another example, the second network device is a wireless client device, and the action performed is a packet is transmitted to the wireless client device from a corresponding AP, the packet including a request to disassociate and re-associate the wireless client device to the AP, and the action is automatically initiated by the controller in response to the wireless client device receiving the message. In this instance, the message includes instructions to perform the action specific to the wireless client device. The automatic action performed by the wireless client device eliminates an amount of time that the wireless client device is inoperable on the network. Said differently, because the controller automatically initiated the action, the wireless client device does not have to wait for a manual intervention by an administrator/user, etc. Further, this programmatic approach may decrease potential error which is incurred by the network through manual intervention.

Network devices include computing devices that are adapted to transmit and/or receive signaling, and to process information within such signaling across a network. For example, a network devices include a client device, an access point, a switch, a node, a controller, a management entity, and/or a data transfer device, etc. A network device (e.g., and/or multiple network devices) may be connected to a gateway which may facilitate the network device(s) connectivity to a network. As used herein, the term "gateway" refers to a network device which may include functionality to communicatively couple one and/or multiple network devices to the internet, a network, and/or other services.

A gateway may communicatively couple multiple network devices, such as a computing device (e.g., a laptop), a printer, an Access Point (AP), a wireless computing device, a switch, and/or a network device coupled to the switch, to a network, the internet, and/or other services. As used herein, the term "communicatively coupled" refers to a network device being coupled directly, indirectly, and/or wirelessly to the gateway such that signals may be transmitted and/or received. The gateway includes functionality to provide DHCP information to the communicatively coupled network devices. DHCP information provides network devices on a Transmission Control Protocol (TCP) and/or Internet Protocol (IP) to obtain their respective configuration information (e.g., their respective IP address) from a server. A DHCP configuration may be changed and or created by a management server, and a new DHCP configuration may be transmitted to the gateway from the management server. As used herein, the term "management server" refers to a network device that may process information and execute instructions that affect the operation of other network devices. The gateway may provide the DHCP configuration to the network devices communicatively coupled to the gateway, and the network devices may demand an alteration such that the new DHCP configuration may be accommodated in the network device.

As used herein, the designator "N", particularly with respect to reference numerals in the drawings, indicates that a plurality of the particular feature so designated can be included with examples of the disclosure. The designators can represent the same or different numbers of the particular features. Further, as used herein, "a plurality of" an element and/or feature can refer to more than one of such elements and/or features.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure and should not be taken in a limiting sense.

What is claimed:

1. A controller comprising:
processing circuitry; and
memory including instructions that, when executed by the processing circuitry cause the processing circuitry to:
receive a dynamic host configuration protocol (DHCP) configuration from a management server;
determine types of devices affected by the DHCP configuration, wherein devices corresponding to the types of devices are communicatively coupled to the controller, and wherein the types of devices comprise an access point (AP), a switch, a client device, a branch gateway, a controller, or a wireless client device;
generate a first message, wherein the first message comprises information indicating the DHCP configuration and a first action specific to devices corresponding to a first device type of the types of devices;
generate a second message, wherein the second message comprises the information indicating the DHCP configuration and a second action specific to devices corresponding to the second device type of the types of devices;
determine to refrain from transmitting the first message to devices corresponding to the first device type of the types of devices,
wherein, by refraining from transmitting the first message, the devices corresponding to the first device type of the types of devices are not manipulated to perform the first action; and
determine to transmit the second message to devices corresponding to the second device type of the types of devices.

2. The controller of claim 1, wherein a network device corresponding with the second device type is an access point (AP), and the second action performed is a re-boot of the AP which is automatically initiated by the controller in response to the AP receiving the second message.

3. The controller of claim 1, wherein a network device corresponding with the second device type is a wireless client device, and the second action performed is a packet is transmitted to the wireless client device from a corresponding access point (AP), the packet including a request to disassociate and re-associate the wireless client device to the AP, where the second action is automatically initiated by the controller in response to the wireless client device receiving the second message.

4. The controller of claim 1, wherein a network device corresponding with the second device type is a switch, and the second action performed is a port shut down and no-shut down which is automatically initiated by the controller in response to the switch receiving the second message.

5. The controller of claim 1, wherein a network device corresponding with the second device type is a client device coupled to a switch, and the second action performed on the switch is a port shut down and no-shut down which is automatically initiated by the controller in response to the client device receiving the second message.

6. The controller of claim 1, wherein the controller is included on a gateway and the management server remotely manages the gateway from a cloud platform.

7. The controller of claim 1, wherein the controller manages a plurality of network devices, and the network device is determined from the plurality of network devices based on which network devices of the plurality of network devices are affected by the DHCP configuration.

8. The controller of claim 1, the controller further to:
refrain from transmitting the first message to a different network device on the DHCP configuration, where the controller determines that the different network device is communicatively coupled to the controller but excluded from the DHCP configuration.

9. The controller of claim 1, wherein the determination to refrain from transmitting the first message to devices corresponding to the first device type of the types of devices is based on the DHCP configuration being irrelevant to the devices corresponding to the first device type of the types of devices.

10. The controller of claim 1, wherein the determination to refrain from transmitting the first message to devices corresponding to the first device type of the types of devices is based on the devices corresponding to the first device type being excluded from the DHCP configuration.

11. The controller of claim 1, wherein the devices corresponding to the second device type of the types of devices automatically initiate the second action without waiting for manual intervention.

12. A system for applying a dynamic host configuration protocol (DHCP) configuration, comprising:
a gateway to receive a DHCP configuration from a management server;
a device management component to identify a network device and types of devices that will be affected by the DHCP configuration, wherein the types of devices comprise an access point (AP), a switch, a client device, a branch gateway, a controller, or a wireless client device; and
a DHCP message component to:
generate a first message, wherein the first message comprises information indicating the DHCP configuration and a first action specific to devices corresponding to a first device type of the types of devices,
generate a second message, wherein the second message comprises the information indicating the DHCP configuration and a second action specific to devices corresponding to a second device type of the types of devices,
determine to refrain from transmitting the first message to devices corresponding to the first device type of the types of devices,
wherein, by refraining from transmitting the first message, the devices corresponding to the first device type of the types of devices are not manipulated to perform the first action,
determine to transmit the second message to devices corresponding to the second device type of the types of devices.

13. The system of claim 12, the device management component is further to:
manage a plurality of network devices communicatively coupled to the gateway; and
categorize each network device of the plurality of network devices by the types of devices.

14. The system of claim 12, wherein a network device corresponding with the second device type automatically performs the second action in response to receiving the second message from the DHCP message component.

15. The system of claim 12, the DHCP message component is further to:
refrain from transmitting the first message to a subset of the plurality of network devices managed by the device management component, where the device management component determines that the subset of the plurality of network devices is communicatively coupled to the gateway but will not be affected from the DHCP configuration.

16. A method comprising:
receiving, by a controller, a dynamic host configuration protocol (DHCP) configuration from a management server;
determining types of devices affected by the DHCP configuration, wherein devices corresponding to the types of devices are communicatively coupled to the controller, and wherein the types of devices comprise an access point (AP), a switch, a client device, a branch gateway, a controller, or a wireless client device;
generating a first message, wherein the first message comprises information indicating the DHCP configuration and a first action specific to devices corresponding to a first device type of the types of devices,
generating a second message, wherein the second message comprises the information indicating the DHCP configuration and a second action specific to devices corresponding to a second device type of the types of devices,
determining to refrain from transmitting a first message to devices corresponding with the first device type of the types of devices,
wherein, by refraining from transmitting the first message, the devices corresponding to the first device type of the types of devices are not manipulated to perform the first action; and
determining to transmit a second message to devices corresponding to the second device type of the types of devices.

17. The method of claim 16, wherein the second action enables a network device to accept the DHCP configuration, and the second action is performed by the network device automatically in response to receiving the second message from the controller.

18. The method of claim 16, wherein the management server transmits the DHCP configuration to multiple gateways within a network.

* * * * *